United States Patent [19]

Clark et al.

[11] Patent Number: 5,059,484

[45] Date of Patent: Oct. 22, 1991

[54] OPTICALLY CLEAR COMPOSITES COMPRISING TWO LAYER OF ORGANIC POLYMERS AND AN ORGANOSILOXANE ADHESIVE

[75] Inventors: Joseph N. Clark, Mapleton, Mich.; Schuyler B. Smith, deceased, late of Midland, Mich., by Chemical Bank and Trust Company, executor

[73] Assignee: Dow Corning Corporation, Midland, Mich.

[21] Appl. No.: 598,459

[22] Filed: Oct. 9, 1990

Related U.S. Application Data

[62] Division of Ser. No. 322,014, Mar. 13, 1989, Pat. No. 4,985,525.

[51] Int. Cl.$^5$ .................. B32B 27/36; B32B 9/04; B32B 27/08
[52] U.S. Cl. .................. 428/412; 428/421; 428/422; 428/447; 428/448; 428/451; 428/522
[58] Field of Search ............... 428/448, 421, 442, 451, 428/447, 522, 422; 528/15, 31, 32, 478; 524/379

[56] References Cited

U.S. PATENT DOCUMENTS

| | | | |
|---|---|---|---|
| 3,677,981 | 7/1972 | Wada et al. | 528/32 |
| 3,817,910 | 6/1974 | Viksne | 528/32 |
| 4,045,390 | 8/1977 | Itoh et al. | 528/15 |
| 4,719,262 | 1/1988 | Plueddmann | 525/105 |
| 4,732,931 | 3/1988 | Maxson | 524/862 |
| 4,795,775 | 1/1989 | Balile et al. | 524/379 |
| 4,857,564 | 8/1989 | Maxson | 528/31 X |

*Primary Examiner*—Thomas J. Herbert, Jr.
*Attorney, Agent, or Firm*—Robert Spector

[57] ABSTRACT

The degree and reproducibility of cohesive bonding between gum-type organosiloxane elastomers cured by a platinum-catalyzed hydrosilation reaction and organic polymer substrates are increased when the composition used to prepare the elastomer contains an amount of silanol-functional polydiorganosiloxane sufficient to impart an activity number of at least 40 to the polydiorganosiloxane gums present in said composition.

4 Claims, No Drawings

OPTICALLY CLEAR COMPOSITES COMPRISING TWO LAYER OF ORGANIC POLYMERS AND AN ORGANOSILOXANE ADHESIVE

This is a divisional of copending application Ser. No. 07/322,014, now U.S. Pat. No. 4,985,525 filed on Mar. 13, 1989.

BACKGROUND OF THE INVENTION

1. Field of the Invention

This invention relates to organosiloxane compositions. More particularly, this invention relates to optically clear organosiloxane compositions that cure by a platinum-catalyzed hydrosilation reaction and exhibit improved and reproducible cohesive bonding to organic polymer substrates.

2. Description of the Prior Art

The optical clarity and chemical resistance of polyorganosiloxanes make these polymers desirable for use as adhesives in a variety of optical applications. In one such application gum type organosiloxanes compositions are used to bond together sheets of optically transparent organic polymers to form composite windows and windscreens. These organosiloxane compositions can be cured by a number of methods.

One curing method involves the reaction of polyorganosiloxanes containing silicon-bonded hydroxyl groups with silanes containing 3 or 4 hydrolyzable groups per molecule. These curing reactions occur under ambient conditions and typically require the presence of atmospheric moisture. This method is not practical for a layer of polyorganosiloxane confined between two layers of organic polymer during curing.

A second curing method involves reacting a gum type polydiorganosiloxane with an organic peroxide to form an elastomeric material. The initial mixture must be heated to a temperature sufficient to decompose the peroxide and generate free radicals, which in turn initiate curing of the polyorganosiloxane. The curing reaction generates organic compounds as by-products, which could interfere with the clarity of the final cured elastomer. These by-products and the high temperatures required to initiate curing make this method less than desirable for curing optically clear organosiloxane compositions that are intended to serve as cured-in-place adhesives for organic polymer substrates.

The aforementioned disadvantages of moisture and peroxide curable organosiloxane elastomer compositions can be avoided using organosiloxane compositions that cure by a hydrosilation reaction between a polyorganosiloxane containing two or more ethylenically unsaturated hydrocarbon radicals per molecule and an organohydrogensiloxane containing two or more silicon-bonded hydrogen atoms per molecule. This reaction is catalyzed by platinum and platinum compounds and does not require moisture or the high temperatures needed to decompose many organic peroxides. While this curing method is convenient, the resultant elastomers are often less than satisfactory with respect to their ability to bond cohesively to organic polymer substrates. The prior art teaches using primer compositions and adhesion promoters of various types to improve this poor adhesion. One such primer composition suitable for improving the bonding between organosiloxane elastomers and organic polymer substrates is taught in U.S. Pat. No. 4,719,262, which issued to E. Plueddemann on Jan. 12, 1988 and U.S. Pat. No. 4,795,775, which issued to M. Baile, J. Braun and J. Clark on Jan. 3, 1989.

The present inventors found a substantial variation in the degree of cohesive bonding between primed organic polymer substrates, such as polycarbonates, and different batches of the same clear gum-type organosiloxane composition curable by a platinum-catalyzed hydrosilation reaction. Further investigations by the present inventors revealed a relationship between this variation in adhesion and the concentration of silanol groups in the various polyorganosiloxanes comprising the curable organosiloxane composition. It is known that the silanol content of ethylenically unsaturated polyorganosiloxanes can vary substantially depending upon the process conditions under which the polymers are prepared.

An objective of this invention is to provide curable elastomeric organosiloxane compositions that reproducibly provide cohesive bonding to a variety of organic polymer substrates.

SUMMARY OF THE INVENTION

The degree and reproducibility of cohesive bonding between gum-type organosiloxane elastomers cured by a platinum-catalyzed hydrosilation reaction and organic polymer substrates are increased when the composition used to prepare the elastomer contains an amount of silanol-functional polydiorganosiloxane sufficient to impart an activity number of at least 40 to the polydiorganosiloxane gums present in said composition.

DETAILED DESCRIPTION OF THE INVENTION

This invention provides an improved organosiloxane composition curable by a platinum-catalyzed hydrosilation reaction and exhibiting cohesive bonding to substrates formed from organic polymers, said composition comprising a first polydiorganosiloxane gum containing at least two ethylenically unsaturated hydrocarbon radicals per molecule, an organohydrogensiloxane containing at least two silicon-bonded hydrogen atoms per molecule and a platinum-containing hydrosilation catalyst. The improvement comprises the presence in said composition of a second polydiorganosiloxane gum containing a concentration of silanol groups sufficient to impart to the mixture of said first and second gums an activity number of at least 40, where said activity number is a function of the increase in viscosity with respect to time of a solubilized curable composition consisting essentially of said mixture, a stoichiometric excess of ethyl orthosilicate, a curing catalyst and a solvent, where said activity number is calculated using the formula $$(600,000)(\log T_{e1}/T_{e2}) / T,$$

where $T_{e1}$ and $T_{e2}$ each represent the time interval, in seconds, required for elution of said solubilized composition from a capillary type viscometer at 25° C., $T_{e1}$ begins ten minutes following formation of said solubilized composition, $T_{e2}$ begins 20 minutes following formation of said solubilized composition and T represents the difference, in minutes, between a) the time interval between formation of said solubilized composition and the end of time interval $T_{e2}$ and b) the time interval between formation of said solubilized composition the end of time interval $T_{e1}$.

1. The Silanol-Containing Polydiorganosiloxane

The inventive feature considered responsible for the improved level and reproducibility of adhesion exhibited by cured elastomers prepared from the present curable composition is the presence in the curable composition from which the elastomer is prepared of a gum type polyorganosiloxane containing a concentration of silanol groups sufficient to provide a gum activity value of from at least 40. The gum activity level is directly proportional to the concentration of silanol groups in a mixture of the polydiorganosiloxane(s) containing ethylenically unsaturated hydrocarbon radicals, referred to hereinafter as ingredient A, and the silanol-substituted polydiorganosiloxane(s).

A preferred method for measuring gum activity is described in the section immediately preceding the examples in this specification.

Cohesive bonding between the present compositions and organic polymer substrates cannot be achieved when the gum activity value is less than about 40. The adhesion gradually improves with increasing gum activity value up to a value of about 80. The present inventors found no substantial improvement in adhesion above activity values of about 80. In addition, under certain conditions the higher silanol content corresponding to gum activity values above about 90 may result in generation of hydrogen during curing of the composition. This is particularly undesirable when the compositions are cured between layers of organic polymers, and the resulting composites are intended to be optically clear. Gum activity values of from 50 to about 80 are preferred.

Silanol-containing polydiorganosiloxane gums are sufficiently well known in the art that a detailed discussion of these polymers in the present specification is not required. In preferred embodiments the silanol groups are present at the terminal positions of the polymer molecules and the Williams Plasticity Number is between 120 and 180.

The concentration of silanol-containing polydiorganosiloxane(s) required to achieve the desired gum activity value can range from 5 to about 33%, based on the weight of ethylenically unsaturated polydiorganosiloxane gum, referred to herein as ingredient A. The activity value will depend upon the silanol content of ingredient A.

It is known that many of the methods used to prepare ingredient A will result in a small concentration of silanol groups in the polymer. Because the presence of terminal silanol groups reduces the number of ethylenically unsaturated hydrocarbon terminal groups available for curing ingredient A by a hydrosilation reaction generating hydrolytically stable silicon-carbon bonds rather than the hydrolyzable silicon-oxygen bonds generated by the reaction of silanol groups, an objective of some preparative methods is to reduce the silanol content to the lowest possible level.

The present inventors discovered some preparative methods reduce the concentration of silanol groups in ingredient A to the extent that it is insufficient to achieve the desired cohesive bonding between organic polymer substrates and elastomers prepared using this ingredient.

To ensure compatibility between the ingredient A and the silanol-containing polydiorganosiloxane(s), the hydrocarbon radicals present in these polymers should be selected from the same class or classes, for example alkyl, haloalkyl and aryl. Preferably the hydrocarbon radicals present on the two types of polydiorganosiloxanes are identical, for example, methyl alone or in combination with phenyl or 3,3,3-trifluoropropyl.

2. The Ethylenically Unsaturated Polydiorganosiloxane Gum (Ingredient A)

The major organosiloxane ingredient of the present compositions is a gum-type polydiorganosiloxane containing at least two ethylenically unsaturated hydrocarbon radicals that are preferably located at the terminal positions of the molecule. Ingredient A has the consistency of a gum at 25° C. These type of polymers are typically characterized in terms of a Williams Plasticity Number that is generally between 50 and about 200, measured in accordance with ASTM test procedure no. D 926.

In addition to terminal ethylenically unsaturated hydrocarbon radicals, from 0.1 to 4 mole percent of the non-terminal diorganosiloxane units in ingredient A can contain a monovalent, ethylenically unsaturated hydrocarbon radical. Ingredient A can be represented by the general formula

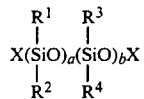

where $R^1$, $R^2$ and $R^3$ are free of aliphatic unsaturation and individually represent monovalent hydrocarbon radicals or halogenated monovalent hydrocarbon radicals, $R^4$ represents an monovalent ethylenically unsaturated hydrocarbon radical, X represents a hydroxyl group, $R^1$, or $R^4$, with the proviso that X represents a monovalent ethylenically unsaturated hydrocarbon radical when b is 0, the value of a is at least 500, the sum of a and b is equivalent to a Williams Plasticity Number of from 50 to about 200, and the value of $b/a+b$ is from 0 to 0.04.

$R^1$, $R^2$ and $R^3$ can represent any monovalent hydrocarbon or halogenated hydrocarbon radical that is free of aliphatic unsaturation and typically contains from one to about 20 carbon atoms. These radicals include but are not limited to methyl, ethyl, propyl, cyclohexyl, phenyl, benzyl, and any of these radicals containing one or more halogen atoms. In preferred embodiments of ingredient A $R^1$ and $R^3$ represent methyl, and $R^2$ represents methyl, phenyl or 3,3,3-trifluoropropyl.

The ethylenically unsaturated hydrocarbon radicals represented by $R^4$ and X contain from 2 to about 20 carbon atoms and include vinyl, allyl and butenyl, with vinyl being preferred based on the availability and cost of the intermediates used to prepare polydiorganosiloxanes containing these radicals.

Particularly preferred embodiments of ingredient A include dimethylvinylsiloxy-terminated polydiorganosiloxanes and copolymers containing from 0.1 to 4 mole percent of methylvinylsiloxane units, the remaining non-terminal units being dimethylsiloxane, methyl-3,3,3-trifluoropropylsiloxane, or a combination of these two units. Most preferably at least 75 mole percent of the repeating units of ingredient A are dimethylsiloxane or methyl-3,3,3-trifluoropropylsiloxane units and the Williams Plasticity Number for the polydiorganosiloxane is from 100 to 200.

Polydiorganosiloxane gums, including those suitable for use as ingredient A of the present compositions, are typically prepared by polymerizing the corresponding diorganocyclosiloxane(s), such as octamethylcyclotetrasiloxane or 2,4,6-tris(3,3,3-trifluoropropylmethyl) cyclotrisiloxane. The polymerization is conducted in the presence of an acid or base catalyst, a controlled amount of water and a precursor of the terminal group, such as sym-tetramethyldivinyldisiloxane. Alternatively, the corresponding halosilane(s) are polymerized in the presence of a suitable catalyst and an acid acceptor.

When the final product is a copolymer containing non-terminal ethylenically unsaturated hydrocarbon radicals, the corresponding diorganocyclosiloxane, such as sym-tetramethyltetravinyl-cyclotetrasiloxane, or a halosilane such as methylvinyldichlorosilane, is present in the reaction mixture used to prepare the polymer.

3. The Organohydrogensiloxane Curing Agent

The organosiloxane compositions of this invention are cured by a platinum catalyzed hydrosilation reaction. The curing agent is an organohydrogensiloxane containing an average of more than two silicon bonded hydrogen atoms per molecule. The organohydrogensiloxane contains from as few as four silicon atoms per molecule up to an average of 20 or more, and can have a viscosity of up to 10 Pa.s or higher at 25° C. The repeating units of this ingredient include but are not limited to $HSiO_{1.5}$, $R^5HSiO$ and/or $R^5{}_2HSiO_{0.5}$ in addition to one or more of monoorganosiloxy, diorganosiloxane, triorganosiloxy and $SiO_{4/2}$ units. In these formulae $R^5$ represents a monovalent hydrocarbon or halogenated hydrocarbon radical as defined hereinabove for the $R^1$ radical of ingredient A. To ensure adequate curing of the composition $R^5$ is selected from the same class of hydrocarbon or halogenated hydrocarbon radicals as $R^1$.

Alternatively the organohydrogensiloxane can be a cyclic compound containing diorganosiloxane and organohydrogensiloxane units or a compound of the formula $Si(OSiR^5{}_2H)_4$.

The molar ratio of silicon bonded hydrogen atoms to vinyl or other ethylenically unsaturated hydrocarbon radicals in compositions curable by a hydrosilation reaction is critical with respect to the properties of the cured elastomer. Given the molecular weights of ingredients A and B, the optimum ratio for the present curable compositions will be determined at least in part by the concentration of ethylenically unsaturated hydrocarbon radicals in ingredients A and B and the type of curing agent. This optimum value can readily be determined by those skilled in the art with a minimum of experimentation, and is not part of this invention.

For preferred compositions of this invention the molar ratio of silicon bonded hydrogen atoms to vinyl and/or other ethylenically unsaturated hydrocarbon radicals is between 1 and 2.

4. The Platinum Hydrosilation Catalyst and Optional Inhibitor

Hydrosilation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned ingredients A and B, curing agents and platinum-containing catalysts may begin to cure at ambient temperature. To increase the storage stability of these compositions or obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol and ethynylcyclohexanol constitute a preferred class of inhibitors that will suppress the activity of a platinum-containing catalyst at 25° C. Compositions containing these catalysts typically require heating at temperatures of 70° C. or above to cure at a practical rate.

If it is desired to increase the pot life or working time of a curable composition under ambient conditions, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

5. The Reforcing Silica Filler and Silica Treating Agents

The curable organosiloxane compositions of this invention contain a reinforcing silica filler to improve the physical strength of both the composition and cured elastomers prepared from these composition. Reinforcing silica fillers have a surface area of from 150 to greater than 400 m²/g. These reinforcing silica fillers are well known in the art and can be obtained commercially. Examples of reinforcing silicas include the fume and precipitated varieties of silica.

The amount of reinforcing filler in the composition can vary from 20 to as much as 100 parts by weight with the usual amount varying between 25 to 75 parts by weight per 100 parts by weight of the polydiorganosiloxane gum.

If it is desired to prepare a transparent cured elastomer containing a reinforcing silica filler one can use the finely divided silica fillers disclosed in U.S. Pat. No. 4,344,800, which issued to M. Lutz on Aug. 17, 1982. This patent is hereby incorporated by reference as a teaching of silica fillers suitable for use in transparent organosiloxane elastomer compositions.

Reinforcing silica fillers are typically treated with a low molecular weight organosilicon compound to prevent a phenomenon referred to as "creping" or "crepe hardening". These silica treating agents reduce the interaction between the polydiorganosiloxane and the reinforcing silica that causes the base to undergo an irreversible increase in viscosity during processing, to the extent that it is no longer processible using conventional techniques.

Suitable silica treating agents are well known in the art, and include but are not limited to hydroxyl terminated short chain polydiorganosiloxane fluids and hexaorganodisilazanes. At least 90 weight percent of the silica treating agent should be compatible with the polydiorganosiloxane gum referred to hereinbefore as ingredient A. The silica treating agent typically constitutes from about 2 up to about 15 percent by weight of the curable composition.

The reinforcing silica in the present compositions can be partially replaced with benzene-soluble copolymers containing repeating units of the formulae $SiO_{4/2}$, $R^6{}_3SiO_{\frac{1}{2}}$ and diorganovinylsiloxy units of the general formula $CH_2=CHR^7{}_2SiO_{\frac{1}{2}}$.

In these formulae $R^6$ and $R^7$ represent identical or different monovalent hydrocarbon or halocarbon radicals containing from 1 to about 20 carbon atoms and are free of ethylenic unsaturation.

The molar ratio of the combination of triorganosiloxy units and diorganovinylsiloxy units to $SiO_{4/2}$ units in the copolymer is from 0.7 to 1.2, inclusive. Vinyl radicals constitute from 0.1 to 8 percent, preferably from 0.5 to 5.0, percent by weight of the copolymer, which preferably contains at least two vinyl radicals per molecule. In preferred embodiments the ranges for the molar ratio of diorganovinylsiloxy: triorganosiloxy: $SiO_{4/2}$ units is 0.08–0.1:0.006–1:1.

The copolymers can be prepared as described in U.S. Pat. No. 2,6756,182, which issued to Daudt and Tyler on Apr. 20, 1954, and is hereby incorporated in this specification by reference thereto. The copolymers described in this patent contain from 2 to 23 percent by weight of hydroxyl groups, this is considerably above the maximum level of about 0.8 weight percent preferred for precursors of the present copolymers.

Briefly, the method of Daudt et al. comprises reacting a silica hydrosol under acidic conditions with the appropriate amount of hexamethyldisiloxane or trimethylchlorosilane. The copolymers used to prepare the present elastomers can be obtained by reacting Daudt et als. product with the required amount of a hexaorganodisilazane or a hexaorganodisiloxane wherein each silicon atom contains a vinyl radical and two methyl or other monovalent hydrocarbon radical.

Utility of the Present Compositions

As disclosed in preceding sections of this specification, the present elastomer compositions are particularly useful as optically clear adhesives for bonding sheets of similar or dissimilar organic polymers to form optically clear composites. In this application the organic polymers may first be coated with an organosilicone primer compositions. Preferred primers are described in U. S. Pat. No. 4,719,262, which issued to E. Plueddemann on Jan. 12, 1988 and U.S. Pat. No. 4,795,775, which issued to M. Baile et al. on Jan. 3, 1989. Both of these patents are incorporated in this specification by reference as teachings of primer compositions useful to achieve cohesive bonding between the present organosiloxane compositions and organic polymer substrates.

It is known that mixtures of a vinyl-containing polyorganosiloxane, an organohydrogensiloxane and a platinum-containing hydrosilation catalyst may begin to cure under ambient conditions, particularly when the temperature exceeds about 27 degrees C. If the present curable compositions are to be stored for any substantial period of time prior to being used it is recommended that the compositions be packaged in at least two parts, with the platinum-containing catalyst and the organohydrogensiloxane being located in different parts of said composition. The vinyl-substituted polyorganosiloxane (ingredient A) can be packaged in either or both of these parts. Ingredient A is preferably present in both parts to facilitate blending of the curable composition.

The following example is intended to describe preferred embodiments of the present invention and should not be interpreted as limitig the scope of the invention as defined in the accompanying claims. Unless otherwise specified all parts and percentages specified in the examples are by weight and viscosities were measured at 25 degrees C.

EXAMPLE

Curable optically clear elastomer samples were prepared by blending the types and amounts of ingredients listed in Table 1 to homogeneity using a sigma-blade mixer.

Two vinyl-containing polydiorganosiloxanes were used. One of these, referred to hereinafter as A1, was dimethylvinylsiloxy terminated dimethylsiloxane/methylvinylsiloxane copolymer containing 0.142 mole percent of methylvinylsiloxane units and exhibiting a Williams Plasticity Number of 150. The second polymer, A2, was dimethylvinylsiloxy terminated polydimethylsiloxane exhibiting a Williams Plasticity Number of 150.

The silanol-containing polymer (A3) was a hydroxyl-terminated polydimethylsiloxane exhibiting a Williams Plasticity Number of 150.

The curing agent (ingredient B) present in each of the compositions was trimethylsiloxy terminated polydiorganosiloxane having an average of five methylhydrogensiloxane units and three dimethylsiloxane units per molecule and containing from 0.7 to 0.8 weight percent of silicon-bonded hydrogen atoms. This ingredient was present at a concentration of 1.75 or 2.54 parts.

Each of the curable compositions also contained 55 parts by weight of a silica filler described in U.S. Pat. No. 4,344,800, which issued to M. Lutz on Aug. 17, 1982, 0.1 part of ethynylcyclohexanol, 0.5 part of cyclic methylvinylsiloxanes, 2 parts of 3-methacryloxypropyltrimethoxysilane and 0.17 part of a reaction product of hexachloroplatinic acid and sym-tetramethyldivinyldisiloxane that has been diluted qwith a liquid dimethylvinylsiloxy terminated polydimethylsiloxane in an amount sufficient to achieve a platinum content of 0.7 weight percent.

Determination of Gum Activity Number

The gum activity number is equivalent to the slope of a plot of the logarithm of the viscosity of solubilized curable composition containing the gum as a function of time, the time being measured from formation of the curable composition by addition of the curing agent (ethyl orthosilicate) and a curing catalyst (dibutyltin diacetate) to the gum. The viscosity values are expressed in terms of the elution time of a solution of the curable composition from a capillary viscometer.

135 parts of a 10 weight percent solution in toluene of the polymer to be evaluated was blended to homogeneity for one minute with 1.0 part of a 10 weight percent solution of ethyl orthosilicate solution in toluene and 1.0 part of dibutyltin diacetate. The time (T′) at which the reagents were combined was noted. A portion of the resultant solution was then placed in a capillary viscometer and the viscometer was placed in a constant temperature bath at 25° C. Ten minutes after T′ the viscometer was removed from the bath and the elution time, in seconds, of the curable composition was recorded as $T_{el}$. The viscometer was then replaced in the constant temperature bath. The time interval between T′ and the end of $T_{el}$ was calculated and recorded as T″. The viscometer was removed from the bath 20 minutes after T′, and the elution time determined and recorded as $T_{e2}$. The time interval between T′ and the end of $T_{e2}$ was calculated and recorded as T‴. The difference between T‴ and T″ was then calculated and recorded as T.

The activitiy number (A.N.) of the gum present in the curable composition was then calculated using the formulae $$A.N. = (600,000)(Log\ T_{el}/T_{e2})/T$$

Preparation of Test Samples

The solubilized primer composition applied to the polycarbonate and acrylic polymer substrates was prepared by blending the following ingredients to homogeneity.

2 parts of the product obtained by reacting equimolar amounts of 1,2-bis(trimethoxysilyl)ethane and the diallyl ether of timethylolpropane in the presence of 1% by weight of tetrabutyl titanate (ingredient 1);

9.9 parts of a 20 percent by weight solution in ethyl acetate of a methyl methacrylate/3-methacryloxypropyltrimethoxysilane copolymer (ingredient 2);

1 part of a trimethylsiloxy terminated polymethylhydrogensiloxane exhibiting a viscosity of 0.13 Pa.s, (ingredient C); and 87.1 parts of 3-methyl-1-buten-3-ol.

Ingredient 1 was prepared by heating the mixture of the reactants and catalyst to the boiling point with stirring. The methanol produced as a by-product of the reaction was continuously removed from the reaction mixture by distillation and collected. Heating of the reaction mixture was continued until the amount of methanol equivalent to a substantially complete reaction had been collected. The final temperature of the reaction mixture was 160° C.

Ingredient 2 was prepared by reacting methyl methacrylate and 3-methacryloxypropyltrimethoxysilane in a molar ratio of 10:1, respectively, in the presence of 1 percent, based on total monomers, of 3-mercaptopropyltrimethoxysilane and a catalytic amount of benzoyl peroxide using ethyl acetate as the polymerization medium.

Laminates were prepared by spraying the solubilized primer composition on to one surface of a sheet of optically clear polycarbonate available as Tuffak A (R) from the Rohm and Haas Company or a sheet of optically clear polymethyl methacrylate available as Plex II or Plex 55 from the Rohm and Haas Company. The dimensions of the sheet were 3.8×15.2×0.6 cm. The sheets were not cleaned or otherwise treated prior to being sprayed with the primer solution. The primer was applied using a spray gun adjusted for a vertical fan pattern. The thickness of the primer layer was about 2000 angstroms.

The primer layer was dried by exposing it to ambient conditions for one hour. A group of five coated polycarbonate substrates were then placed adjacent to one another with primed sides up on a metal plate that had been covered with a sheet of polytetraflouroethylene. A 3 cm-wide strip of polytetrafluoroethylene was placed across one end of each sample to create an adhesion-free area. A 1.3 mm-thick calendared film of the optically clear curable elastomer to be evaluated was then positioned so as to cover all of the samples, followed by a sheet of 30-mesh stainless steel screening. The screening had been previously washed with toluene, rinsed with acetone, dried and finally wiped with a piece of cheesecloth that had been saturated with the printer composition described in the preceding section of this example. The solvent was 3-methyl-1-buten-3-ol.

After drying for one hour under ambient conditions the sheet of primed screening was placed on the elastomer film so as to cover all of the primed substrates. The screening was then covered with a calendared elastomer film identical in composition to the one previously applied over the substrate, followed by a second sheet of polytetrafluoroethylene and a second metal plate.

The samples were cured by placing the resultant composite in a hydraulic press and heating it for 2 hours at a temperature of 100° C. under a pressure of 200 psig (1.4 MPa). After cooling the five coated polycarbonate or acrylic polymer substrates were separated from one another.

Before the coated subtrates were evaluated a 6 mm-wide strip of screening an calendared film was trimmed from each of the two 15.2 cm-long sides of each sample to leave a 2.5 cm-wide strip of laminate adhered to the substrate.

The degree to which the cured elastomer adhered to the polycarbonate or acrylic polymer substrate was evaluated by subjecting the cured samples to an adhesion test similar to that descreibed in ASTM test procedure no. D-903. The procedure was modified by exerting the peeling force at an angle of 90 degrees with respect to the plane of the substrate, rather than at an angle of 180 degress as described in the ASTM test procedure.

The percent cohesive failure was determined by estimating the percentage of originally primed substrate surface containing cured elastomer adhering to it. The force required to peel the elastomer from the substrate was measured using a load cell associated with the device used to exert the force required to peel the elastomer layer from the substrate. These force values are recorded in Table 2. Unless indicated by a letter A, the substrate was the polycarbonate.

Compositions prepared using gums with activity numbers below the present limit of 40 were evaluated for comparative purposes. These samples are identified by the letter C following the sample number. All of

TABLE 1

| Sample No. | Gum Activity Number | A1 (parts) | A2 (parts) | A3 (parts) | B (parts) |
| --- | --- | --- | --- | --- | --- |
| 1(C) | 35 | — | 100 | 0 | 1.75 |
| 2 | 45 | — | 94.5 | 5.5 | 1.75 |
| 3 | 60 | — | 87.5 | 12.5 | 1.75 |
| 4 | 80 | — | 78.0 | 22.0 | 1.75 |
| 5 | 88 | — | 75.0 | 25.0 | 1.75 |
| 6(C) | 28 | 100 | — | 0 | 1.75 |
| 7 | 75 | 78 | — | 22 | 1.75 |
| 8(C) | 28 | 100 | — | 0 | 2.54 |
| 9(C) | 38 | 94.5 | — | 5.5 | 2.54 |
| 10 | 56 | 87.5 | — | 12.5 | 2.54 |
| 11 | 78 | 78.0 | — | 22.0 | 2.54 |
| 12 | 85 | 75.0 | — | 25.0 | 2.54 |

TABLE 2

| Sample No. | % CF | Force (Kg) |
| --- | --- | --- |
| 1(C) | 30 | 25.7 |
| 2 | 80 | 27 |
| 3 | 100 | ND |
| 4 | 100 | ND |
| 5 | 100 | ND |
| 6(C) | 75 | 26.6 |
| 7 | 100 | ND |
| 8(C) | 5 | 4.5 |
| 9(C) | 5 | 4.5 |
| 10 | 100 | 20.3 |
| 11 | 100 | 26.6 |
| 12 | 100 | 27.5 |
| 12(A) | 100 | 23.9 |

CF = Cohesive Failure
A = Substrate was the acrylic polymer
ND = Not determined due to failure at screen/elastomer interface That which is claimed is:

1. In an optically clear composite comprising two sheets of similar or dissimilar organic polymers and a layer of an optically clear adhesive between said sheets, where said adhesive comprises an organosiloxane composition curable by a platinum-catalyzed hydrosilation reaction, and said composition comprises a first polydiorganosiloxane gum containing at least two ethylenically unsaturated hydrocarbon radicals per molecule, an organhydrogensiloxane containing at least two silicon-bonded hydrogen atoms per molecule and a platinum-containing hydrosilation catalyst, the improvement comprising (1) selecting said organic polymers from the group consisting of polycarbonates and polymethyl methacrylate and (2) the presence in said composition of a second polydiorganosiloxane gum containing a concentration of silanol groups sufficient to impart to the mixture of said first and second gums an activity number of from 40 to 80, inclusive, where said activity number is a function of the increase in viscosity with respect to time of a solubilized curable composition consisting essentially of said mixture, a stoichiometric excess of ethyl orthosilicate, a curing catalyst and a solvent, where said activity number is calculated using the formula $$(600{,}000)(\text{Log } T_{e1}/T_{e2}) / T,$$

where $T_{e1}$ and $T_{e2}$ each represent the time interval, in seconds, required for elution of said solubilized composition from a capillary type viscometer at 25° C., $T_{e1}$ begins ten minutes following formation of said solubilized composition, $T_{e2}$ begins 20 minutes following formation of said solubilized composition and T represents the difference, in minutes, between a) the time interval between formation of said solubilized composition and the end of time interval $T_{e2}$ and b) the time interval between formation of said solubilized composition the end of time interval $T_{e1}$.

2. A composite according to claim 1 where said organic polymers are dissimilar and the surfaces of said sheets in contact with said layer are coated with a primer.

3. A compositre according to claim 2 where said activity value is from 60 to 80 and said first polydiorganosiloxane gum exhibits the formula

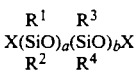

where $R^1$, $R^2$ and $R^3$ are free of aliphatic unsaturation and individually represent monovalent hydrocarbon radicals or halogenated monovalent hydrocarbon radicals, $R^4$ represents an monovalent ethylenically unsaturated hydrocarbon radical, X represents a hydroxyl group, $R^1$ or $R^4$, with the proviso that X represents a monovalent ethylenically unsaturated hydrocarbon radical when b is 0, the value of a is at lest 500, the sum of a and be is equivalent to a Williams Plasticity Number of from 50 to about 200, and the value of b/a+b is from 0 to 0.04.

4. A composite according to claim 3 where $R^1$ and $R^3$ are methyl, $R^2$ is methyl, phenyl or 3,3,3-trifluoropropyl, $R^4$ is vinyl or allyl, the hydrocarbon radicals present in said first and second polydiorganosiloxane gums are identical, the Williams Plasticity Number for said first and second polydiorganosiloxane gums is from 100 to 200, the molar ratio of ehtylenically unsaturated hydrocarbon radicals to silicon-bonded hydrogen atoms in said composition is from 1 to 2 and said platinum-containing hydrosilation catalyst is a complex of hexachloroplatinic acid and a vinyl -containing organosilicon compound.

* * * * *